US005770965A

United States Patent [19]

Gritt, Jr. et al.

[11] Patent Number: 5,770,965

[45] Date of Patent: Jun. 23, 1998

[54] CIRCUIT AND METHOD OF COMPENSATING FOR NON-LINEARITIES IN A SENSOR SIGNAL

[75] Inventors: George B. Gritt, Jr., Mesa; Ira E. Baskett, Tempe, both of Ariz.

[73] Assignee: Motorola, Inc., Schaumburg, Ill.

[21] Appl. No.: 722,407

[22] Filed: Sep. 30, 1996

[51] Int. Cl.[6] .......... G06F 7/556

[52] U.S. Cl. .......... 327/349; 327/4

[58] Field of Search .......... 327/4, 103, 346, 327/347, 349, 350–352, 355, 356, 361, 362, 378, 538, 541; 323/315, 316; 324/720; 330/9; 326/29

[56] References Cited

U.S. PATENT DOCUMENTS

| | | | |
|---|---|---|---|
| 3,663,833 | 5/1972 | Pao et al. | 327/347 |
| 4,317,126 | 2/1982 | Gragg, Jr. | 357/26 |
| 4,585,961 | 4/1986 | Daubert | 327/349 |
| 4,800,759 | 1/1989 | Hirata et al. | 73/708 |
| 4,883,992 | 11/1989 | Koglin et al. | 327/513 |
| 5,107,150 | 4/1992 | Kimura | 327/349 |
| 5,146,152 | 9/1992 | Jin et al. | 323/280 |
| 5,479,092 | 12/1995 | Pigott et al. | 323/313 |

*Primary Examiner*—Timothy P. Callahan
*Assistant Examiner*—My-Trang Nu Ton
*Attorney, Agent, or Firm*—Robert D. Atkins; Robert F. Hightower

[57] ABSTRACT

A compensation circuit (106) corrects for nonlinearities in a sensor signal representing the physical state of a sensor (100). A transducer (102) produces a non-linear component in a transducer voltage signal. A voltage-current converter (104) converts the tranducer voltage signal to a transducer current which contains the non-linear component. A compensation circuit (106) squares the transducer current ($I_{216}$) and uses a scaling current ($I_{412}$) to generate a compensation current ($I_{408}$) equal to the non-linear component. The current ($I_{216}$) and scaled compensation current ($I_{408}$) are summed at a summing junction (418) to produce an output current ($I_{OUT}$) which is a substantially linear representation of the physical state of the sensor.

15 Claims, 2 Drawing Sheets

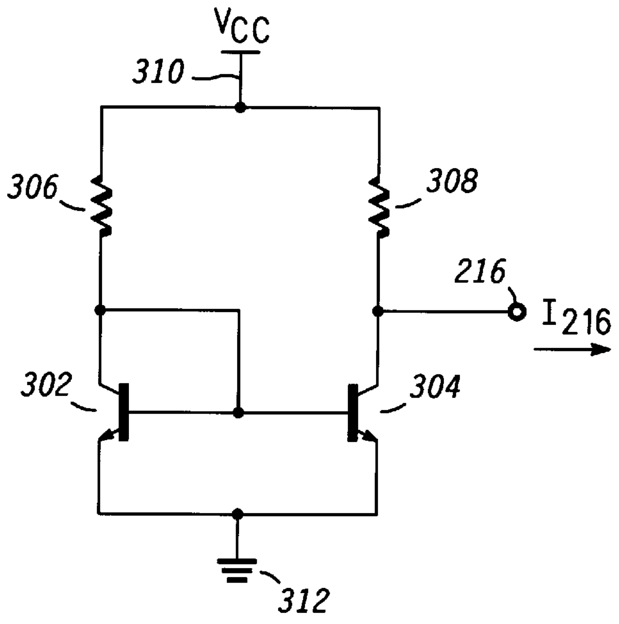
FIG. 3
FIG. 4
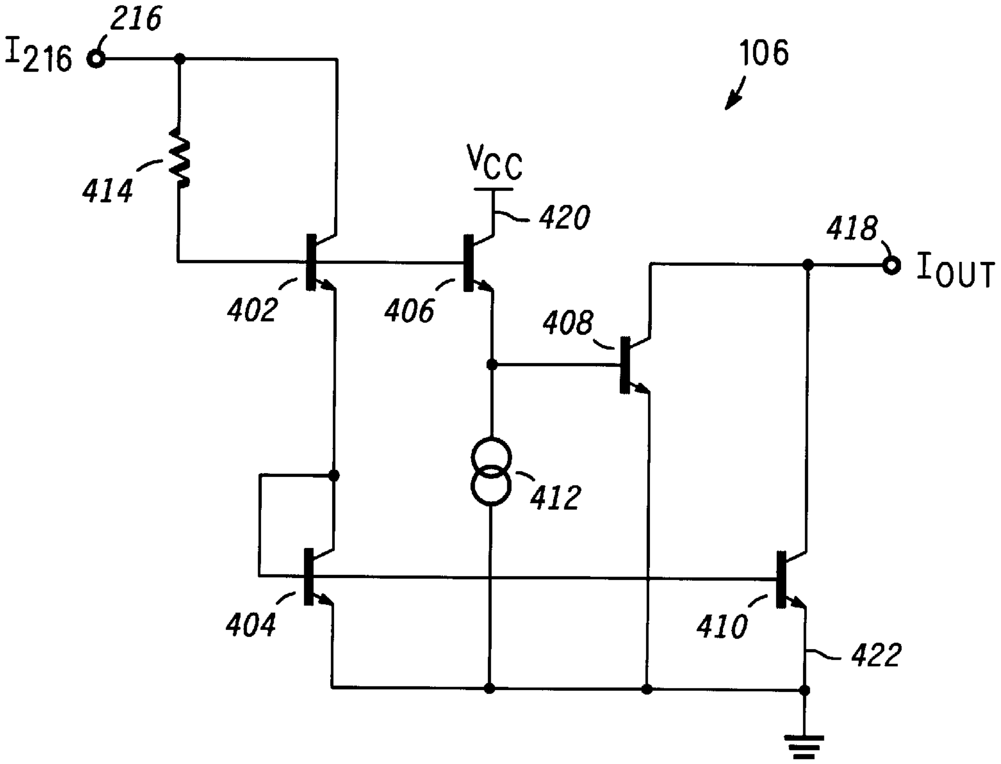

CIRCUIT AND METHOD OF COMPENSATING FOR NON-LINEARITIES IN A SENSOR SIGNAL

BACKGROUND OF THE INVENTION

The present invention relates in general to sensor circuits and, more particularly, to a compensation circuit for reducing non-linearities in a sensor signal.

Sensor circuits are well known for converting physical conditions such as temperature, pressure, and acceleration to an electrical sensor signal for further processing. A typical sensor, such as a pressure sensor, includes a diaphragm for converting a pressure into a force. A transducer converts the force into an electrical sensor signal, and a signal conditioning circuit performs further amplification and filtering on the sensor signal.

Ideally, there is a linear relationship between the physical condition and the sensor signal. However, in most if not all sensors, the sensor signal does not accurately represent the physical condition because of non-linearities introduced by the transducer. For example, in the case of a pressure sensor, the deformation of the diaphragm has a non-linear component whose magnitude increases as the square of the applied pressure. The non-linearity typically results from membrane stresses relating to the thickness and physical dimensions of the diaphragm. The non-linear component is undesirable because it results in an error term being introduced into the sensor output signal. The magnitude of the non-linear error can be as high as 5 or 10% in a pressure sensor, and even higher with sensors designed for use in harsh environments.

Many applications, including fuel injection systems in automobiles, medical applications such as blood pressure instruments, and environmental control systems, require an accuracy of better than 1%. Prior art pressure sensors typically use physical structures such as bosses to reduce the error. The bosses are thick structures disposed in the diaphragm to increase rigidity and constrain the deformation of the diaphragm. However, bosses reduce the sensitivity of a pressure sensor and thus are not suitable for low pressure sensor applications. Moreover, bosses increase both the die size and the complexity of the diaphragm, which increases the manufacturing cost of the sensor.

Hence, a need exits for a sensor having a substantially linear output signal that accurately represents the sensed physical condition.

BRIEF DESCRIPTION OF THE DRAWINGS

FIG. 3 illustrates an alternate embodiment of the transducer and ; voltage-current converter; and FIG. 4 illustrates a schematic diagram of a squaring circuit compensating the non-linearity in the sensor.

DETAILED DESCRIPTION OF THE DRAWINGS

Figure 1:
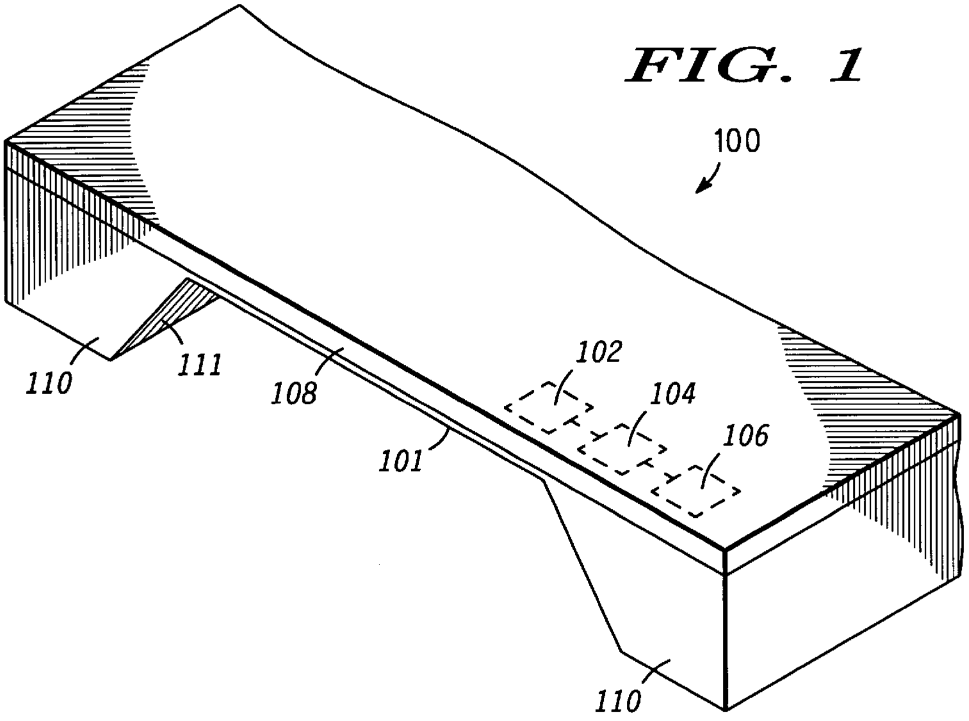
FIG. 1 illustrates an isometric view of a sensor.

Referring to FIG. 1, a pressure sensor 100 is shown suitable for manufacture as an integrated circuit (IC) using conventional IC processes. A sensor diaphragm 101 is formed from substrate 110 which provides a mechanical base for diaphragm 101. An epitaxial layer 108 is disposed on substrate 110 to provide an etch stop during the manufacture of sensor 100. Epitaxial layer 108 further provides a high quality base for building transistors on pressure sensor

100. Diaphragm 101 is formed by anisotropically etching substrate 110 along plane 111 of substrate 110 to remove a portion of substrate 110. Typically, epitaxial layer 108 is formed to a thickness of about 15 microns. Even though the embodiment of FIG. 1 describes a pressure sensor 100, the present invention is equally applicable to other type of sensors such as temperature and acceleration sensors.

Transducer 102 is formed on the surface of diaphragm 101 for sensing a deformation of diaphragm 101 when a pressure is applied. Transducer 102 is typically a piezoresistive device such as a Wheatstone bridge. Another example of transducer 102 is disclosed in U.S. Pat. No. 4,317,126 and is hereby incorporated by reference. Yet another example of transducer 102 is disclosed in U.S. patent application No. 08/395,228, filed Feb. 27, 1995 by Brian D. Meyer et al. and assigned to Motorola, Inc. Transducer 102 provides a transducer output voltage which corresponds to the displacement of diaphragm 101. The output voltage from transducer 102 has a non-linear component introduced by membrane stress in diaphram 101.

Voltage-current converter 104 and compensation circuit 106 are formed in a region over substrate 110 which is not deformed by the applied pressure to diaphragm 101. The output voltage from transducer 102 is applied to voltage-current converter 104, which produces a transducer output current to compensation circuit 106. The output current of voltage-current converter 104 has a non-linear component corresponding to the non-linear component of the output voltage of transducer 102. Transducer 102, voltage-current converter 104, and compensation circuit 106 are all formed on the same epitaxial layer 108 in accordance with conventional semiconductor process techniques.

Figure 2:
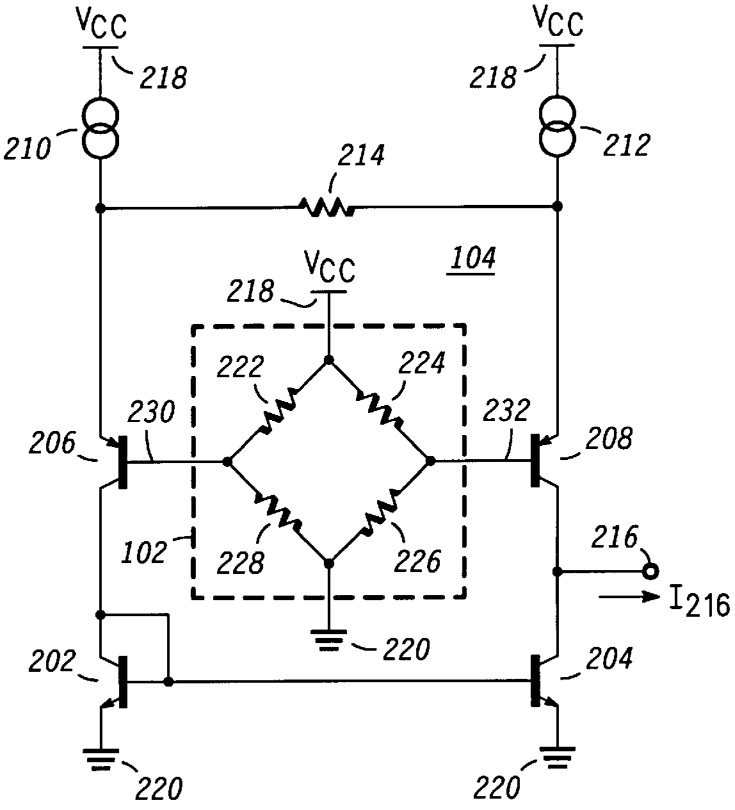
FIG. 2 illustrates a schematic diagram of a transducer and a voltage-current converter.

Referring to FIG. 2, an embodiment of a voltage-current converter 104 is shown in conjunction with transducer 102. Transducer 102 as shown in FIG. 2 comprises a Wheatstone bridge including resistors 222, 224, 226 and 228 coupled in a well-known bridge configuration. Resistor 222 is coupled between node 230 and power supply conductor 218 operating at $V_{cc}$=5.0 volts. Resistor 224 is coupled between power supply conductor 218 and node-232. Resistor 226 is coupled between node 232 and power supply conductor 220 operating at ground potential. Resistor 228 is coupled between power supply conductor 220 and node 230. The output voltage of transducer 102 is provided differentially across nodes 230 and 232. As an alternative, the output voltage can be provided as a single-ended signal at either node 230 or node 232.

In operation, resistors 222–228 are typically configured to have equal resistances when no pressure is applied to the diaphragm of sensor 100. Therefore, the respective voltages appearing at nodes 230 and 232 are equal and the differential output voltage across nodes 230 and 232 is zero volts. When pressure is applied to cause a deflection in diaphragm 101, the piezoresistive effect causes resistors 222–228 to change values in accordance with the applied pressure. The result is an unbalancing of the Wheatstone bridge of transducer 102 such that a differential voltage signal is produced across nodes 230 and 232. Because the deflection characteristic of the diaphragm is non-linear, the differential transducer output voltage signal also has a corresponding non-linear component.

Voltage-current converter 104 comprises transistors 202, 204, 206, and 208, resistor 214, and current sources 210 and 212. Transistors 202 and 204 comprise a current mirror referenced to power supply conductor 220, which has an input coupled to the collector of transistor 206 and an output coupled to the collector of transistor 208 for providing an output current $I_{216}$ at node 216. The bases of transistors 206 and 208 are respectively coupled to nodes 230 and 232 for receiving the transducer output voltage provided by transducer 102. Resistor 214 is coupled between the emitters of transistors 206 and 208. Current source 210 referenced to power supply $V_{cc}$ has an output coupled to the emitter of transistor 206. Current source 212 referenced to power supply $V_{cc}$ has an output coupled to the emitter of transistor 208. Current sources 210 and 212 are typically matched to provide similar currents.

When no pressure is applied to sensor 100, voltage-current converter 104 operates in a balanced condition such that the voltage at node 230 equals that at node 232. Therefore, the voltage across resistor 214 is zero and equal currents flow through the emitter-collector conduction paths of transistors 206 and 208. Because the current flowing through transistor 206 is mirrored in transistor 204, the current flowing through transistor 208 equals the current flowing through transistor 204. Thus, output current $I_{216}$ is equal to zero. When the diaphragm is deflected by an applied pressure, a differential input voltage appears across nodes 230 and 232, and a substantially equal voltage appears across resistor 214. A current flows through resistor 214 which unbalances voltage-current converter 104 and produces a nonzero output current $I_{216}$. Output current $I_{216}$ has a non-linear component which corresponds to the non-linear component of the differential voltage signal provided across nodes 230 and 232.

Referring to FIG. 3, an alternative embodiment of a combination transducer and voltage-current converter is shown. Resistor 306 is a piezoresistive device which is typically formed on diaphragm 101 of the mechanical portion of pressure sensor 100. Resistor 306 operates as a transducer whose resistance changes as diaphragm 101 is deflected in response to an applied pressure.

Transistors 302 and 304 operate as a current mirror having an input coupled to one terminal of resistor 306 and an output coupled to one terminal of resistor 308 at node 216. The other terminal of resistor 306 is coupled to power supply conductor 310 operating at a potential of $V_{cc}$=5.0 volts and the other terminal of resistor 308 is coupled to power supply conductor 310. The collector of transistor 304 is coupled to node 216 for providing an output current $I_{216}$. Resistor 308 and transistors 302 and 304 are typically formed in a region of semiconductor substrate 110 where their operational characteristics are not subjected to modification by a pressure applied to diaphragm 101 of sensor 100. Resistor 308 is configured over substrate 110 of sensor 100 to match resistor 306 such that resistors 306 and 308 have equal resistances when no pressure is applied to the diaphragm.

In operation, a current flows through resistor 306 and the collector-emitter conduction path of transistor 302 which is modified when an applied pressure changes the resistance of resistor 306. A transducer voltage signal at the input of current mirror 302–304 is thereby produced. The current flowing through transistor 302 is mirrored at the collector of transistor 304. Resistor 308 provides collector biasing for the collector of transistor 304. Under an applied pressure, the resistance of resistor 306 changes to create a mismatch with the resistance of resistor 308 to produce output current $I_{216}$ at node 216.

Referring to FIG. 4, a compensation circuit 106 is shown including an input terminal 216 for receiving an input current $I_{216}$ and an output terminal 418 for producing an output current $I_{OUT}$. Input current $I_{216}$ is typically received from voltage-current converter 104 shown in FIG. 2. Current $I_{216}$ has a non-linear component corresponding to the non-linear characteristic of sensor 100. The non-linear component of input current $I_{216}$ is quadratic and includes at least a second order term proportional to a square of the magnitude of input current $I_{216}$. The non-linear component is of such a polarity that the non-linear component acts to reduce input current $I_{216}$ from its ideal linear relationship to the physical state of the sensor.

Compensation circuit 106 comprises transistor 402 having a collector coupled to input terminal 216 and an emitter coupled to the common collector and base of transistor 404. A resistor 414 is coupled between the base and collector of transistor 402. Transistor 406 has a base coupled to the base of transistor 402, and a collector coupled to power supply conductor 420 operating at a potential of $V_{cc}$=5.0 volts. Current source 412 supplies a current $I_{412}$ to the emitter of transistor 406. Transistor 408 has a base coupled to the emitter of transistor 406, an emitter coupled to power supply conductor 422 operating at ground potential, and a collector coupled to output terminal 418 of compensation circuit 106. Transistor 410 has a base coupled to the base of transistor 404, an emitter coupled to power supply conductor 422, and a collector coupled to output terminal 418.

In operation, input current $I_{216}$ flows through the emitter-collector conduction paths of transistors 402 and 404 to establish a reference potential at the base of transistor 402 which is equal to the sum of the emitter-base voltages of transistors 402 and 404. Because transistors 404 and 410 are configured as a current mirror, a current flows from the collector of transistor 410 to output terminal 418 which is proportional to input current $I_{216}$ flowing through transistor 404.

Transistors 406 and 408 combine with current source 412 to form a squaring circuit for compensating the non-linear component of input current $I_{216}$. Because current source 412 provides a constant current to the emitter of transistor 406, the compensation current $I_{408}$ provided at the collector of transistor 408 can be shown to be proportional to the square of input current $I_{216}$ in accordance with the following equation:

$$I_{408}=K^*(I_{216})^2/I_{412}$$

where K is a constant which depends on the relative scaling of the emitter areas of transistors 402, 404, 406 and 408.

Current $I_{412}$ provides a further degree of freedom for scaling compensation current $I_{408}$ in accordance with the physical properties of sensor diaphragm 101 to compensate for a non-linear component of the signal produced by sensor 100. Current $I_{412}$ is typically determined empirically for a given sensor structure to quantify the magnitude of non-linearity in input current $I_{216}$ which is to be corrected. Recall that the collector current of transistor 410 is proportional to input current $I_{216}$ and has a nonlinear component. To produce an output current $I_{OUT}$ which is a substantially linear representation of the physical state of sensor diaphragm 101, output terminal 418 provides a summing junction for summing the compensation current $I_{408}$ with the collector current of transistor 410.

The embodiment shown in FIG. 4 demonstrates a bipolar implementation of the compensation circuit of the present invention. FIG. 2 and FIG. 3 respectively show differential and single-ended voltage-current converters implemented with bipolar transistors. One of ordinary skill in the art would understand the interchangeability of technologies such that appropriate modifications could be made to the described implementations in order to implement the present invention using another technology, such as a metal-oxide-semiconductor technology. Furthermore, current sources 210 and 212 may be implemented by resistors. Likewise, current source 412 may be implemented with a resistor.

In an alternate embodiment of the present invention, the NPN bipolar transistors shown in FIGS. 2–4 could be implemented with PNP bipolar transistors while the PNP bipolar transistors shown in FIG. 2 could be implemented as NPN bipolar transistors.

By now it should be appreciated that the present invention provides a circuit and method for correcting an error in a signal produced by a sensor. The error results in the signal having a non-linear component at the output of the transducer. A compensation circuit generates a compensation current equal to the non-linear component by squaring the input current. A current source is used for scaling the compensation current to the magnitude of the input current. The input current and scaled compensation current are summed at a summing node to produce an output current which is a substantially linear representation of the physical state of the sensor.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention. For example, from the exponential relationship between the emitter-base voltage and collector current of a bipolar transistor, the present invention could be modified to correct for cubic and higher order non-linearities as well as non-linearities proportional to the square of the transducer signal.

What is claimed is:

1. A sensor, comprising:

a transducer having an output for providing a transducer signal in response to a physical state; and a squaring circuit having an input coupled for receiving the transducer signal and having an output for providing a correction signal as a function of a square of the transducer signal to compensate for a non-linear component of the transducer signal.

2. The sensor of claim 1 where the squaring circuit further includes a summing circuit for summing the correction signal with a signal proportional to the transducer signal for providing a substantially linear output signal of the sensor.

3. The sensor of claim 2 further including a voltage-current converter having an input coupled to the output of the transducer for receiving a transducer voltage and having an output for providing a transducer current.

4. The sensor of claim 3 wherein the squaring circuit includes:

a first transistor having a control terminal and a first conduction terminal each coupled for receiving the transducer current;

a second transistor having a control terminal and a first conduction terminal coupled together to a second conduction terminal of the first transistor, and a second conduction terminal coupled to a first power supply conductor;

a third transistor having a control terminal coupled to the control terminal of the first transistor, a first conduction terminal coupled to a second power supply conductor;

a current source having an output coupled to a second conduction terminal of the third transistor; and a fourth transistor having a control terminal coupled to the second conduction terminal of the third transistor, a first conduction terminal for providing the correction signal, and a second conduction terminal coupled to the first power supply conductor.

5. The sensor of claim 4 wherein the summing circuit includes:

a fifth transistor having a control terminal coupled to the control terminal of the second transistor, a first conduction terminal for conducting the transducer signal, and a second conduction terminal coupled to the first power supply conductor; and a summing junction coupled to the first conduction terminal of the fourth transistor and to the first conduction terminal of the fifth transistor for providing the substantially linear output signal of the sensor.

6. The sensor of claim 3 wherein the voltage-current converter includes:

a first transistor having a control terminal coupled for receiving a first component of the transducer signal;

a second transistor having a control terminal coupled for receiving a second component of the transducer signal;

a first current source having an output coupled to a first conduction terminal of the first transistor;

a third transistor having a control terminal and a first conduction terminal coupled together to a second conduction terminal of the first transistor, and a second conduction terminal coupled to a first power supply conductor;

a second current source having an output coupled to a first conduction terminal of the second transistor; and a fourth transistor having a control terminal coupled to the control terminal of the third transistor, a first conduction terminal coupled to the first power supply conductor, and a second conduction terminal coupled to a second conduction terminal of the second transistor for providing the transducer current.

7. The sensor of claim 3 wherein the voltage-current converter includes:

a first transistor having a control terminal and a first conduction terminal coupled together for receiving the transducer voltage, and a second conduction terminal coupled to a first power supply conductor;

a second transistor having a control terminal coupled to the control terminal of the first transistor, a first conduction terminal coupled to the first power supply conductor; and a resistor having a first terminal coupled to a second power supply conductor and a second terminal coupled to a second conduction terminal of the second transistor for providing the transducer current.

8. A method of sensing a physical state, comprising the steps of:

converting the physical state to a sense signal where the sense signal has a non-linear component; and squaring the sense signal to provide a correction signal to compensate for the non-linear component.

9. The method of claim 8 further including the steps of:

converting a sense voltage representative of the physical state to a sense current; and summing the correction signal with a current proportional to the sense current to provide a substantially linear output signal representative of the physical state.

10. An integrated sensing device, comprising:

a transducer having an output for providing a transducer signal in response to a physical state where the transducer signal has a non-linear component; and a squaring circuit having an input coupled for receiving the non-linear component of the transducer signal and providing a correction signal as a function of a square of the transducer signal to compensate for the non-linear component of the transducer signal to provide a substantially linear output signal of the integrated sensing device.

11. The integrated sensing device of claim 10 further including a voltage-current converter having an input coupled to the output of the transducer for receiving a transducer voltage and having an output for providing a transducer current to the squaring circuit.

12. The integrated sensing device of claim 11 wherein the squaring circuit includes:

a first transistor having a control terminal and a first conduction terminal each coupled for receiving the transducer current;

a second transistor having a control terminal and a first conduction terminal coupled together to a second conduction terminal of the first transistor, and a second conduction terminal coupled to a first power supply conductor;

a third transistor having a control terminal coupled to the control terminal of the first transistor, a first conduction terminal coupled to a second power supply conductor;

a current source having an output coupled to a second conduction terminal of the third transistor; and a fourth transistor having a control terminal coupled to the second conduction terminal of the third transistor, a first conduction terminal for providing the correction signal, and a second conduction terminal coupled to the first power supply conductor.

13. The integrated sensing device of claim 12 wherein the squaring circuit includes:

a fifth transistor having a control terminal coupled to the control terminal of the second transistor, a first conduction terminal for conducting the transducer signal, and a second conduction terminal coupled to the first power supply conductor; and a summing junction coupled to the first conduction terminal of the fourth transistor and to the first conduction terminal of the fifth transistor for providing the substantially linear output signal of the integrated sensing device.

14. The integrated sensing device of claim 11 wherein the voltage-current converter includes:

a first transistor having a control terminal coupled for receiving a first component of the transducer signal;

a second transistor having a control terminal coupled for receiving a second component of the transducer signal;

a first current source having an output coupled to a first conduction terminal of the first transistor;

a third transistor having a control terminal and a first conduction terminal coupled together to a second conduction terminal of the first transistor, and a second conduction terminal coupled to a first power supply conductor;

a second current source having an output coupled to a first conduction terminal of the second transistor; and a fourth transistor having a control terminal coupled to the control terminal of the third transistor, a first conduction terminal coupled to the first power supply conductor, and a second conduction terminal coupled to a second conduction terminal of the second transistor for providing the transducer current.

15. The integrated sensing device of claim 11 wherein the voltage-current converter includes:

a first transistor having a control terminal and a first conduction terminal coupled together for receiving the transducer voltage, and a second conduction terminal coupled to a first power supply conductor;

a second transistor having a control terminal coupled to the control terminal of the first transistor, a first conduction terminal coupled to the first power supply conductor; and a resistor having a first terminal coupled to a second power supply conductor and a second terminal coupled to a second conduction terminal of the second transistor for providing the transducer current.

* * * * *